United States Patent
Flegel

(10) Patent No.: US 9,331,470 B1
(45) Date of Patent: May 3, 2016

(54) LINE SIDE CIRCUIT PROTECTION SYSTEM

(71) Applicant: Reliance Controls Corporation, Racine, WI (US)

(72) Inventor: Michael O. Flegel, Racine, WI (US)

(73) Assignee: Reliance Controls Corporation, Racine, WI (US)

( * ) Notice: Subject to any disclaimer, the term of this patent is extended or adjusted under 35 U.S.C. 154(b) by 384 days.

(21) Appl. No.: 14/044,319

(22) Filed: Oct. 2, 2013

Related U.S. Application Data

(60) Provisional application No. 61/711,948, filed on Oct. 10, 2012.

(51) Int. Cl.
*H02H 3/00* (2006.01)
*H02H 3/16* (2006.01)

(52) U.S. Cl.
CPC .................................... *H02H 3/162* (2013.01)

(58) Field of Classification Search
CPC ..................................................... H02H 3/162
USPC .......................................................... 361/42
See application file for complete search history.

(56) References Cited

U.S. PATENT DOCUMENTS

| | | | |
|---|---|---|---|
| 4,110,808 A | | 8/1978 | Hobson et al. |
| 4,580,186 A | * | 4/1986 | Parker .................... H02H 3/165 361/42 |
| 5,751,524 A | | 5/1998 | Swindler |
| 7,446,437 B2 | | 11/2008 | Paik et al. |
| 7,521,822 B2 | | 4/2009 | Lorenz |
| 7,692,332 B2 | | 4/2010 | Nordman et al. |
| 7,755,869 B2 | * | 7/2010 | Mikrut ................... H02H 9/005 361/42 |
| 7,932,635 B2 | | 4/2011 | Shenoy et al. |
| 7,986,500 B2 | * | 7/2011 | Lazarovich .......... G01R 31/025 340/649 |
| 7,995,316 B2 | | 8/2011 | Riley et al. |
| 8,879,218 B2 | * | 11/2014 | Tomimbang ......... H02H 1/0015 361/42 |
| 9,035,782 B1 | * | 5/2015 | Flegel ..................... H02H 9/04 307/64 |
| 9,136,693 B1 | * | 9/2015 | Flegel ...................... H02H 3/16 |
| 2010/0010684 A1 | | 1/2010 | Lorenz et al. |

* cited by examiner

*Primary Examiner* — Stephen W Jackson
(74) *Attorney, Agent, or Firm* — Boyle Fredrickson, S.C.

(57) ABSTRACT

A line-side circuit interrupter protection system monitors the current flowing in a circuit in order to determine whether any current is flowing outside of the circuit upstream of the point at which a power supply is connected to a plurality of circuits. The system is located between the power supply and the main circuit panel, which is advantageous in certain applications in which an auxiliary power supply is used when a utility power supply is unavailable. In the event that the system detects current flowing outside of the circuit, the circuit will be broken to eliminate any potentially unsafe conditions.

20 Claims, 2 Drawing Sheets

LINE SIDE CIRCUIT PROTECTION SYSTEM

CROSS-REFERENCE TO RELATED APPLICATIONS

This application claims priority to U.S. provisional application Ser. No. 61/711,948, filed Oct. 10, 2012, the entire contents of which is incorporated herein by reference.

BACKGROUND OF THE INVENTION

1. Field of the Invention

The present invention relates in general to the field of circuit interrupters. More particularly, the present invention relates to a ground fault circuit interrupter on the line side of a main electrical panel, which is before the point at which the neutral of the power supply is connected to the system grounding conductor (commonly known as the bonding point). The bonding point for utility power is typically accomplished at the main electrical panel, also known as the service entrance panel. This panel ma be used in conjunction with a transfer switch or power inlet for use with an auxiliary power supply such as a portable generator. In particular, such a device would be useful when powering a structure from an unbonded power supply such as utility power supply or a floating-neutral portable generator.

2. Discussion of the Related Art

Ground fault circuit interrupters (GFCI) are commonly used in a number of applications where there is potential for current to flow outside of a load. All known current ground fault protection is located on the load side, meaning that it is located downstream from the bonding point, between the main electrical panel and the user. For example, it is very common for outlets or switches to contain GFCI devices within the receptacle. This means that the current flows from an external source first to the main electrical panel, and flows next to the GFCI receptacle. The GFCI receptacle provides a single, hot supply of current. When properly functioning, there is a single return supply of current that flows through the receptacle. However, in certain dangerous scenarios, at least a portion of the current is routed outside the device that is plugged into the outlet, which creates two current returns: one through the outlet and one outside the outlet. When this occurs, the GFCI is immediately actuated to cut off the hot supply of current such that the electrical circuit is broken. These types of GFCI outlets disconnect the power supply in the event that excessive current flows to the ground. One common application for these types of outlets is in settings where there is frequent water use.

A typical GFCI device measures the amount of current flowing from the outlet in comparison with current returning to the outlet. In the event that there is less flow returning (meaning some of that current is flowing through another source to the ground), the hot source is stopped, which prevents further flow of current outside of the circuit. This is an effective means to prevent potentially dangerous situations because the hot source is the only supply of current, and ending such flow will break the electrical circuit.

However, this configuration is ineffective where a diversion of power occurs upstream of the main electrical panel. When properly functioning, there is a single return of current from the main electrical panel to the power supply; however, in the event of a diversion in current upstream of the main electrical panel, there are two current paths: one through the wiring to the main electrical panel and one through the diversion to the ground. The traditional load-side GFCI configuration that cuts off the power supply is ineffective on an upstream, line side of the circuit because shutting off the hot supply after the point of diversion does not break the circuit. Rather it would supply the entire flow of current through the diversion. A configuration in which this situation may occur is when an external power supply, such as a portable generator, is present and an individual accidentally interferes with the current flow between the power supply and the main electrical panel.

What is needed, therefore, is a current interrupter device that may be installed between the power supply and the main electrical panel such that current flow may be stopped when a diversion upstream of the main electrical panel occurs, such as when an individual accidentally interferes with the supply of power prior to the point at which power is supplied to the main electrical panel.

BRIEF DESCRIPTION OF THE INVENTION

By way of summary, the present invention is a ground fault circuit interrupter device that is located on the upstream, line side of the circuit prior to the point at which the power supply is connected to the main electrical panel.

In accordance with a first aspect of the invention, a GFCI device may be located in a power inlet box connected in a circuit adapted to be powered by an auxiliary power supply, such as a portable electrical generator. The circuit will have hot, neutral, and ground conductors. The power inlet box may be connected to a transfer switch or transfer panel that functions to supply power from the auxiliary power supply to specific circuits. Such a transfer switch is commonly used when the primary utility power supply is lost and an emergency energy supply is needed. The transfer switch is connected to at least one circuit of the main circuit panel. In order to complete the circuit, the return current flows back into the main circuit panel, which is subsequently connected to the transfer switch, with a connection back through the power inlet box, and lastly back to the power supply. In operation, the GFCI will measure the amount of current entering the power inlet box and compare this current to the current returning from the power inlet box. In the event that these values are not the same, such as when there is a power diversion upstream of the power inlet box, the GFCI cuts the neutral so that current returning on the neutral will be interrupted. This effectively breaks the circuit to cease the flow of current elsewhere and, in particular, to the current diversion. The supply of a conduction path via the hot conductor may also be disconnected by the GFCI device, since a circuit with a voltage potential present on the hot supply without a connected neutral may be detrimental to the circuit.

Although this system will normally be most applicable to systems utilizing a temporary, emergency power supply such as a portable generator, it may also be applicable with other types of incoming power if the power is directed through an inlet box or the like. The GFCI device may also be located at other points on the upstream, line side of the circuit such as at a transfer switch or at the main electrical panel upstream of the point at which power is supplied to the circuits in the main electrical panel.

According to one embodiment of the invention, a circuit interrupter system to disconnect a power supply from a load is disclosed. The power supply has a hot conductor and a neutral conductor, and the neutral connector is electrically connected to an earth ground at a bonding point between the power supply and the load. The circuit interrupter system includes a current sensor generating a signal corresponding to the amplitude of current conducted between the power supply and the load, a switch operatively connected between the power supply and the bonding point, and a control circuit configured to generate the control signal as a function of the signal from the current sensor. The current sensor is operatively connected between the power supply and the bonding point, and the switch is configured to connect the neutral conductor of the power supply to the bonding point in a first position, to disconnect the neutral conductor of the power supply from the bonding point in a second position, and to receive a control signal to selectively operate in one of the first position and the second position.

According to another aspect of the invention, the current sensor may include a toroid through which the hot conductor and the neutral conductor are passed and a coil wound around the toroid. The signal is a current inductively coupled into the coil as a function of a differential in the amplitude of current present in the hot conductor and the amplitude of current present in the neutral conductor. The control circuit may include a driver circuit configured to receive the current from the coil, to generate the control signal to operate the switch in the first position when the current from the coil is less than a predefined threshold, and to generate the control signal to operate the switch in the second position when the current from the coil is greater than the predefined threshold.

According to yet another aspect of the invention, the current sensor may include a first current sensor generating a first signal corresponding to the amplitude of current present on the neutral conductor and a second current sensor generating a second signal corresponding to the amplitude of current present on the hot conductor. The control circuit may include a comparator circuit configured to generate the control signal as a function of the first signal and the second signal. The comparator circuit generates the control signal to operate the switch in the first position when the first signal is equal to the second signal and to operate in the second position when the first signal is not equal to the second signal.

According to still another aspect of the invention, the circuit interrupter system includes a transfer switch having a housing with a first set of inputs configured to receive the hot conductor and the neutral conductor from a power supply and a second set of inputs configured to receive a hot conductor and a neutral conductor from a second power supply. The current sensor, the switch, and the control circuit may each be contained in the housing of the transfer switch. Optionally, the circuit interrupter system may include an inlet box configured to receive the hot conductor and the neutral conductor from the power supply, and the current sensor, the switch, and the control circuit may be contained in the inlet box.

According to yet another aspect of the invention, the switch is further configured to connect the hot conductor of the power supply to the load in the first position and to disconnect the hot conductor of the power supply from the load in the second position. The power supply may include a second hot conductor and the switch may be further configured to connect the second hot conductor of the power supply to the load in the first position and to disconnect the second hot conductor of the power supply from the load in the second position.

According to another embodiment of the invention, a circuit interrupter protection system for a power supply includes a connection point at which the power supply is connected to a plurality of electrical circuits, a hot conductor connected between the power supply and the connection point, a neutral conductor connected between the power supply and the connection point, and a circuit interrupter located between the power supply and the connection point. The hot conductor and the neutral conductor are connected to the circuit interrupter. The circuit interrupter functions to disconnect the neutral conductor from the connection point in the event of a current differential between the hot conductor and the neutral conductor to thereby break the circuit and stop the flow of current on the hot conductor.

According to another aspect of the invention, the circuit interrupter is located within an enclosure located between the power supply and the connection point. Optionally, the connection point is a service entrance panel for a building and the circuit interrupter is mounted to the service entrance panel.

These and other features and aspects of the present invention will be better appreciated and understood when considered in conjunction with the following description and the accompanying drawings. It should be understood, however, that the following description, while indicating a representative embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and tanning a part of this specification, wherein like reference numerals designate the same elements in the several views, and in which.

Figure 1:
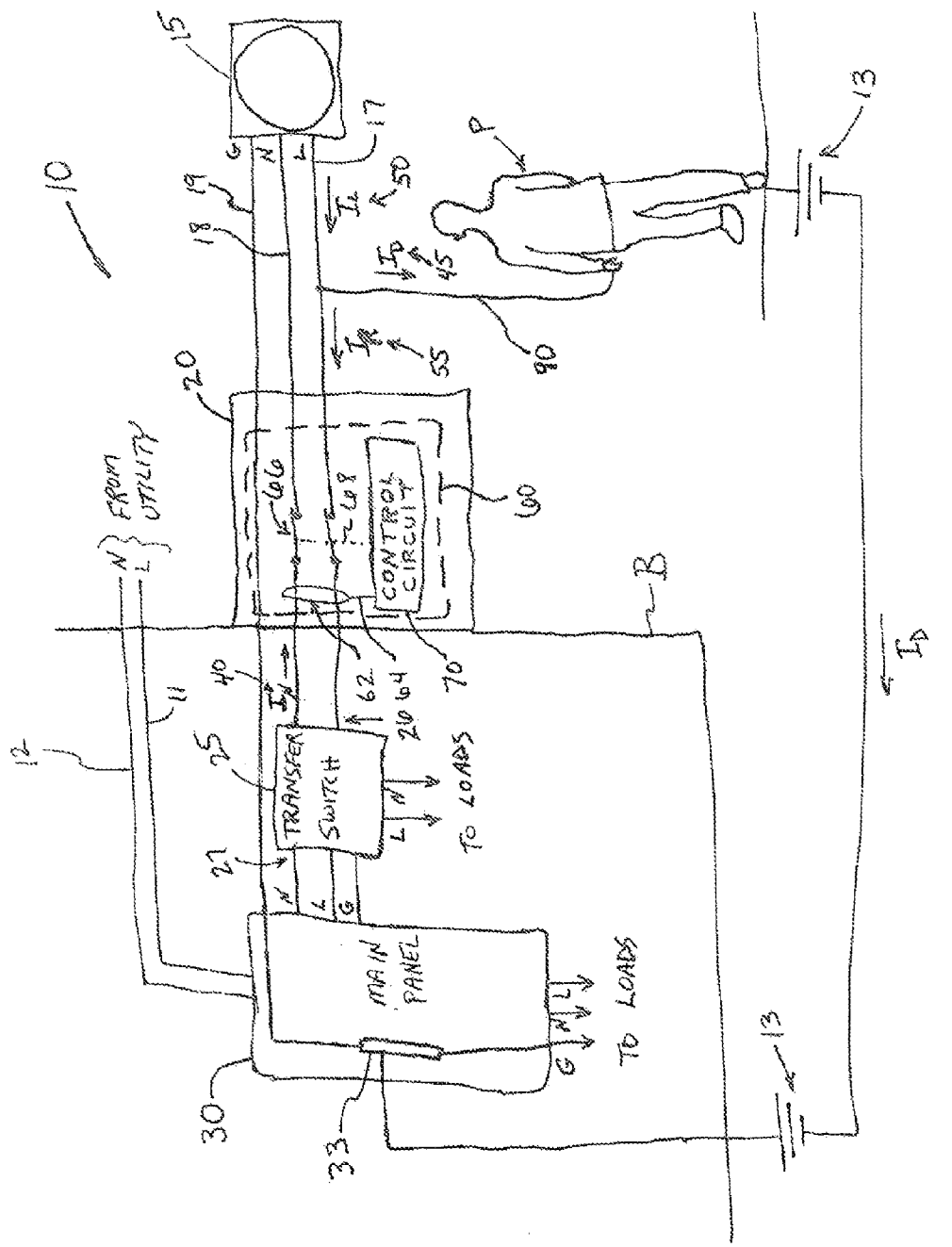
FIG. 1 is a block diagram of an exemplary line side circuit protection system according to one embodiment of the invention.

In describing the embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected, attached, or terms similar thereto are often used. They are not limited to direct connection but include connection, through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiment described in detail in the following description.

As shown in FIG. 1, one embodiment of the circuit interrupter protection system 10 in accordance with the present invention includes a power supply 15, a power inlet box 20, a transfer switch 25, a main electrical panel or service entrance 30, and a circuit interrupter 60. The circuit connections between each component include hot (L), neutral (N), and ground (G) conductors. The hot conductor 17 from the power supply 15 will carry the supply current ($I_L$) 50, while the neutral conductor N will carry the return current ($I_N$) 40. The power supply 15 may be a portable generator, backup generator, or any other type of power supply having an electrical connection that passes through a power inlet box 20 or other connection device located upstream of the main electrical panel 30.

The supply current ($I_L$) 50 flows from the power supply 15 to the power inlet box 20, through the circuit interrupter 60 and to the transfer switch 25. According to the illustrated embodiment, the transfer switch 25 includes a first set of inputs 26 configured to receive the hot conductor 17 and the neutral conductor 18 from the power source 15 and a second set of inputs 27 configured to receive the hot conductor 11 and the neutral conductor 12 from another power source, such as utility power. The transfer switch 25 alternately connects the hot and neutral conductors from one of the power sources to the loads connected to the transfer switch 25. It is contemplated that the transfer switch may be controlled manually or automatically. As illustrated, the transfer switch 25 may be included in a separate enclosure. Optionally, the transfer switch 25 may be integrated in the main panel 30. The transfer switch 25 may be configured such that it supplies current to all of the circuits in the main panel 30, or, more typically, to selective circuits based on the needs as identified by the user. According to yet another embodiment of the invention, each of the power sources may include two hot leads L, each supplying a voltage to the loads. In a split-phase distribution system a first hot lead L1 and a second hot lead L2 each provide a voltage having the same amplitude but are one hundred eighty degrees out of phase.

In a power distribution system, the neutral conductor from the power source is bonded to an earth ground 13 at a single point, referred to herein as a bonding point 33 within the distribution system. The bonding point 33 may be, for example, a ground bar in the main panel 30. The ground conductor 19 from the power supply 15 and each of the neutral conductors 18, 12 from the power source 15 and the utility grid, respectively, are connected to the bonding point 33. As illustrated, the ground conductor 19 is solidly connected to the bonding point 33. Each of the neutral conductors are connected, for example, via intermediate terminals and/or switched connections (not shown) in the main panel 30 and/or the transfer switch 25 according to the application requirements. The bonding point 33 is, in turn, connected to the earth ground 13.

Current returning from the load circuits flows back to the power supply 15 via the neutral conductor 18. The return current ($I_N$) 40 is conducted from the main panel 30 back through the transfer switch 25, the power inlet box 20, and the circuit interrupter 60 before returning to the power supply 15. As illustrated, the circuit interrupter 60 is located in the power inlet box 20. Optionally, the circuit interrupter 60 may be included in the transfer switch 25 or in the main panel 30 as long as the neutral conductor 18 from the power supply 15 is connected through the circuit interrupter 60 prior to being connected to the bonding point 33.

The circuit interrupter 60 is configured to selectively connect the neutral conductor 18 of the power supply 15 to the bonding point 33. The circuit interrupter 60 includes a current sensor 62 monitoring the current flowing on the hot conductor 17 and the neutral conductor 18 between the power supply 15 and the load. If the power source 15 includes multiple hot conductors 17, the current sensor 62 may be configured to monitor the current flowing on each of the hot conductors 17 and the neutral conductor 18 between the power supply 15 and the load. A control circuit 70 receives a signal from the current sensor 62 corresponding to this monitored current. The control circuit 70 is configured to generate a signal 68 which, in turn, opens and/or closes a switch 66 to connect the neutral conductor 18 to the bonding point 33. It is contemplated that the switch 66 may be an electromechanical device, such as a relay, a solid state device, such as a transistor, or a combination thereof. As illustrated, the switch 66 may also be used to connect/disconnect the hot lead 17 from the load.

In the event there is exterior contact with the conductors connecting the power supply 15 to the power inlet box 20, some of the supply current ($I_L$) 50 on the hot conductor 17 may be diverted through an alternate conduction path 90. A portion of the supply current 50 becomes diverted current ($I_D$) 45 conducted through the alternate conduction path 90 and the remainder of the supply current 50 is illustrated as residual current ($I_R$) 55 conducted on the hot conductor 17 beyond the diversion point for supply to power inlet box 20. When there is no diverted current 45, the supply current 50 flows in an uninterrupted manner to power inlet box 20, and the return current 40 on the neutral conductor 18 is equal to the supply current 50 on the hot conductor 17. However, when there is diverted current 45 via the alternate conduction path 90, such as by a person standing on the ground coming into contact with the hot conductor 17, the residual current 55 flowing on the hot conductor 17 will not equal the return current 40 on the neutral conductor 18. The residual current 55 flows through the power inlet box 20 and the circuit interrupter 60 on the hot conductor 17 at the same time the return current 40 flows through the power inlet box 20 and the circuit interrupter 60 on the neutral conductor 18.

In operation, the current sensor 62 in the circuit interrupter 60 measures the amount of residual current 55 entering the inlet box 20 from the power supply 15 on the hot conductor 17. Additionally, the current sensor 62 measures the return current 40 entering the power inlet box after flowing through the circuits in the main panel 30 and back through the transfer switch 25. This return current 40 continues from the inlet box 20 and returns to the power supply 15. A signal, or multiple signals, 64 corresponding to the amplitude of current is provided from the current sensor 62 to a control circuit 70. When the residual current is not equal to the return current, this indicates that a portion of the current is being diverted through the alternate conduction path 90. The control circuit 70 generates a control signal 68 which causes a switch 66 to disconnect the neutral conductor 18 between the power source 15 and the bonding point 33 thereby breaking the electrical circuit and interrupting current flow from the power source 15 via either the hot conductor 17 or the alternate conduction path 90.

Figure 2:
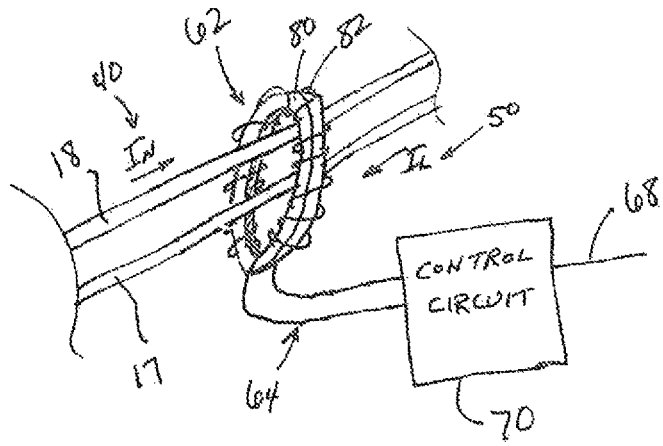
FIG. 2 is a block diagram representation of one embodiment of a circuit interrupter as shown in FIG. 1.

According to one embodiment of the invention, the current sensor 62 generates one signal 64 corresponding to a differential in the amplitude of current in the hot conductor 17 and the neutral conductor 18. With reference to FIG. 2, the current sensor 62 may be in the form of a coil 82 wound about a toroid 80. Each of the hot conductor 17 and the neutral conductor 18 are passed through the toroid 80. Current conducted in either conductor 17, 18 establishes a magnetic field about the conductor. The toroid 80 is selected from a suitable core material to conduct the magnetic field which, in turn, induces a current in the coil 82 wound around the toroid. The direction of current flow in the hot conductor 17 and the neutral conductor 18 is opposite of each other. As a result, magnetic fields of opposite polarity are established in the toroid 80. The amplitude of the magnetic field and the resulting current induced in the coil 82 is proportional to the amplitude of current flowing in the conductor passing through the toroid 80. Thus, if the amplitude of current in each of the hot conductor 17 and the neutral conductor 18 is the same, each establishes a magnetic field of equal amplitude and opposite polarity, resulting in a magnetic field having a net amplitude of zero and no current induced in the coil 82. If there is a difference in the amplitudes of the current in the hot conductor 17 and the neutral conductor 18, a magnetic field having a non-zero amplitude is established in the toroid 80, resulting in a current being induced in the coil 82. The control circuit 70 may monitor the amplitude of current being generated on the coil 82 and define a set point, above which the control signal 68 is set to open the switch 66.

Figure 3:
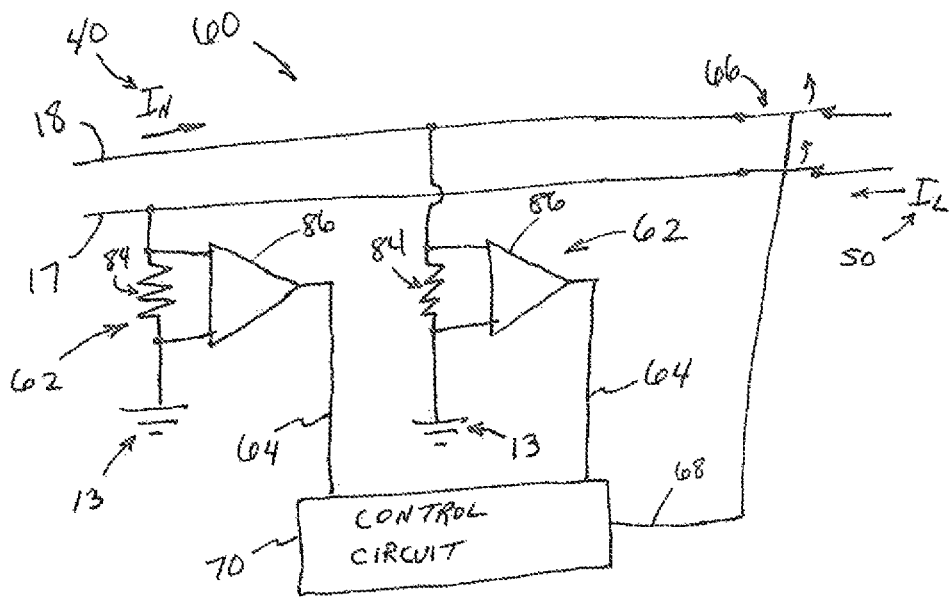
FIG. 3 is a schematic representation of another embodiment of a circuit interrupter as shown in FIG. 1.

According to another embodiment of the invention, the current sensor 62 may include multiple sensors, each configured to generate a signal 64 corresponding to the amplitude of current flowing in one of the conductors. With reference to FIG. 3, the current sensor may include a current sense resistor 84 and an amplifier 86 operatively connected to each conductor 17, 18 to generate a signal 64 corresponding to the amplitude of current in the corresponding conductor 17, 18. Each current signal 64 is provided to the control circuit 70 which is configured to generate the control signal 68 to open the switch 66 when the difference in amplitude between the control signals 68 exceeds a predefined set point. It is contemplated that still other current sensing circuits, devices or sensing arrangements may be utilized to sense a current differential and generate a control signal without deviating from the scope of the invention.

Upon receiving the signal 64 from the current sensor 62, the control circuit 70 determines whether to interrupt the current flowing on the neutral conductor 18. The control circuit 70 may include, for example, one or more operational amplifiers comparing a single input signal 64, such as the current signal from the toroidal coil 82, against a voltage reference to determine whether the current differential in the hot conductor 17 and the neutral conductor 18 exceeds a maximum predetermined level. Optionally, one or more operational amplifiers may compare multiple input signals 64, first against each other, for example, with independent current sense resistors 84 and subsequently compare the difference against a voltage reference to determine whether the current differential in the hot conductor 17 and the neutral conductor 18 exceeds a maximum predetermined level. According to yet another embodiment of the invention, the control circuit 70 may include a processing device, such as a microprocessor, configured to receive the current signal, or signals. 64 as an input and generate a control signal 68 responsive to the current signal, or signals, 64. It is contemplated that still other combinations of analog and/or digital electronic devices may be utilized to monitor the current signal 64 and generate a control signal 68 without deviating from the scope of the invention.

The control signal 68 is used to control a switch 66 to selectively disconnect the neutral lead 18 between the power source 15 and the bonding point 33. According to one embodiment of the invention, a relay may be used. The contacts of the relay are connected in series with the neutral lead 18 and the control signal 68 is connected to the solenoid controlling the relay. Optionally, a power electronic device, such as a power transistor may be used. The neutral conductor 18 may be connected in series with the transistor and the control signal 68 may be connected, for example, to the gate pin of the transistor to enable/disable the transistor and open/close the conduction path of the neutral conductor 18. According to yet another embodiment of the invention, a relay having multiple contacts or multiple power electronic devices may be used to disconnect both the hot lead 17 and the neutral lead 18 between the power source 15 and the bonding point 33 responsive to the control signal 68 in order to prevent potential damage to the loads that may result from leaving a hot conductor connected while disconnecting the neutral conductor.

Although the above embodiment provides that the circuit interrupter 60 is contained within the inlet box 20, in alternative embodiments the circuit interrupter 60 may be located within other portions of the circuit. For example, the circuit interrupter 60 may be contained in the main panel 30, the transfer switch 25 or other panel, subpanel, enclosure or housing, or included in a utility meter. Regardless of where the circuit interrupter 60 is located, it will measure the residual current 55 and return current 40 at a location upstream of the bonding point 33 and prevent ground fault injury to a person that comes in contact with the conductors for the power source 15 coming into a building.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A circuit interrupter system to disconnect a power supply from a load, wherein the power supply has a hot conductor and a neutral conductor, the neutral connector electrically connected to an earth ground at a bonding point between the power supply and the load, the circuit interrupter system comprising:
   a current sensor generating a signal corresponding to an amplitude of current conducted between the power supply and the load, wherein the current sensor is operatively connected between the power supply and the bonding point,
   a switch operatively connected between the power supply and the bonding point, wherein the switch is configured to connect the neutral conductor of the power supply to the bonding point in a first position, to disconnect the neutral conductor of the power supply from the bonding point m a second position, and to receive a control signal to selectively operate in one of the first position and the second position; and
   a control circuit configured to generate the control signal as a function of the signal from the current sensor.

2. The circuit interrupter system of claim 1 wherein the current sensor further comprises:
   a toroid through which the hot conductor and the neutral conductor are passed; and
   a coil wound around the toroid, wherein the signal is a current inductively coupled into the coil as a function of a differential in an amplitude of current present in the hot conductor and an amplitude of current present in the neutral conductor.

3. The circuit interrupter system of claim 2 wherein the control circuit includes a driver circuit configured to receive the current from the coil, to generate the control signal to operate the switch in the first position when the current from the coil is less than a predefined threshold, and to generate the control signal to operate the switch in the second position when the current from the coil is greater than the predefined threshold.

4. The circuit interrupter system of claim 1 wherein the current sensor further comprises:

a first current sensor generating a first signal corresponding to an amplitude of current present on the neutral conductor; and a second current sensor generating a second signal corresponding to an amplitude of current present on the hot conductor.

5. The circuit interrupter system of claim 4 wherein the control circuit includes a comparator circuit configured to generate the control signal as a function of the first signal and the second signal.

6. The circuit interrupter system of claim 5 wherein the comparator circuit generates the control signal to operate the switch in the first position when the first signal is equal to the second signal and to operate the switch in the second position when the first signal is not equal to the second signal.

7. The circuit interrupter system of claim 1 further comprising a transfer switch having a housing with a first set of inputs configured to receive the hot conductor and the neutral conductor from the power supply and a second set of inputs configured to receive a hot conductor and a neutral conductor from a second power supply, wherein the current sensor, the switch, and the control circuit are contained in the housing of the transfer switch.

8. The circuit interrupter system of claim 1 further comprising an inlet box configured to receive the hot conductor and the neutral conductor from the power supply, wherein the current sensor, the switch, and the control circuit are contained in the inlet box.

9. The circuit interrupter system of claim 1 wherein the switch is further configured to connect the hot conductor of the power supply to the load in the first position and to disconnect the hot conductor of the power supply from the load in the second position.

10. The circuit interrupter system of claim 9 wherein the power supply includes a second hot conductor and the switch is further configured to connect the second hot conductor of the power supply to the load in the first position and to disconnect the second hot conductor of the power supply from the load in the second position.

11. A circuit interrupter protection system for a power supply, comprising:
a connection point at which the power supply is connected to a plurality of electrical circuits;
a hot conductor connected between the power supply and the connection point;
a neutral conductor connected between the power supply and the connection point; and
a circuit interrupter located between the power supply and the connection point, wherein the hot conductor and the neutral conductor are connected to the circuit interrupter, and wherein the circuit interrupter functions to disconnect the neutral conductor from the connection point in the event of a current differential between the hot conductor and the neutral conductor to thereby break the circuit and stop the flow of current on the hot conductor.

12. The circuit interrupter protection system of claim 11, wherein the circuit interrupter is located within an enclosure located between the power supply and the connection point.

13. The circuit interrupter protection system of claim 11, wherein the connection point is a service entrance panel for a building and the circuit interrupter is mounted to the service entrance panel.

14. The circuit interrupter protection system of claim 11, wherein the circuit interrupter disconnects the hot conductor from the connection point when the current of the hot conductor is not equal to the current of the neutral conductor.

15. The circuit interrupter protection system of claim 14, further comprising a second hot conductor connected between the power supply and the connection point, wherein the circuit interrupter disconnects the second hot conductor from the connection point when the sum of the currents in the hot conductor and the second hot conductor is not equal to the current of the neutral conductor.

16. The circuit interrupter protection system of claim 11, wherein the circuit interrupter includes:
a toroid through which the hot conductor and the neutral conductor are passed; and
a coil wound around the toroid, wherein a current is inductively coupled into the coil as a function of a differential in an amplitude of current present in the hot conductor and an amplitude of current present in the neutral conductor.

17. The circuit interrupter protection system of claim 16, wherein the circuit interrupter further includes:
a switch configured to open responsive to a control signal, wherein the switch disconnects the neutral conductor from the connection point when it opens; and
a driver circuit configured to receive the current inductively coupled into the coil, to generate the control signal to close the switch when the current inductively coupled into the coil is less than a predefined threshold, and to generate the control signal to open the switch when the current inductively coupled into the coil is greater than the predefined threshold.

18. The circuit interrupter protection system of claim 11, wherein the circuit interrupter includes:
a first current sensor generating a first signal corresponding to an amplitude of current present on the neutral conductor; and
a second current sensor generating a second signal corresponding to an amplitude of current present on the hot conductor.

19. The circuit interrupter protection system of claim 18, wherein the circuit interrupter further includes:
a switch configured to open responsive to a control signal, wherein the switch disconnects the neutral conductor from the connection point when it opens; and
a comparator circuit configured to generate the control signal as a function of the first signal and the second signal.

20. The circuit interrupter system of claim 19 wherein the comparator circuit generates the control signal to close the switch when the first signal is equal to the second signal and to open the switch when the first signal is not equal to the second signal.

* * * * *

UNITED STATES PATENT AND TRADEMARK OFFICE
CERTIFICATE OF CORRECTION

PATENT NO. : 9,331,470 B1  
APPLICATION NO. : 14/044319  
DATED : May 3, 2016  
INVENTOR(S) : Michael O. Flegel Page 1 of 1

It is certified that error appears in the above-identified patent and that said Letters Patent is hereby corrected as shown below:

IN THE CLAIMS

Claim 1, column 8, line 44, after "point" delete "m" and insert therefor -- in --.

Signed and Sealed this  
Twenty-eighth Day of June, 2016

Michelle K. Lee  
*Director of the United States Patent and Trademark Office*